United States Patent
Gupta et al.

(10) Patent No.: US 9,888,399 B2
(45) Date of Patent: *Feb. 6, 2018

(54) ADAPTIVE MONITORING FOR CELLULAR NETWORKS

(71) Applicant: International Business Machines Corporation, Armonk, NY (US)

(72) Inventors: Parul Gupta, Bangalore (IN); Ravindranath Kokku, Hyderabad (IN); Kang-Won Lee, Nanuet, NY (US); Ramya Raghavendra, White Plains, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,694

(22) Filed: Mar. 9, 2016

(65) Prior Publication Data

US 2016/0192221 A1    Jun. 30, 2016

Related U.S. Application Data (63) Continuation of application No. 14/014,596, filed on Aug. 30, 2013, now Pat. No. 9,319,911.

(51) Int. Cl.
*H04W 24/08* (2009.01)
*H04B 17/26* (2015.01)
(Continued)

(52) U.S. Cl.
CPC ............ *H04W 24/08* (2013.01); *H04B 17/26* (2015.01); *H04L 43/12* (2013.01); *H04M 15/41* (2013.01);
(Continued)

(58) Field of Classification Search
CPC . H04W 24/08; H04W 16/04; H04W 28/0189; H04W 28/04; H04W 88/02; H04L 43/12; H04M 15/41
(Continued)

(56) References Cited

U.S. PATENT DOCUMENTS 6,028,914 A    2/2000   Lin et al.
7,355,996 B2   4/2008   Hrastar
(Continued)

OTHER PUBLICATIONS

International Search Report & Written Opinion dated Dec. 2, 2014 received for PCT application No. PCT/US14/53400.

*Primary Examiner* — Kamran Afshar
*Assistant Examiner* — Farid Seyedvosoghi
(74) *Attorney, Agent, or Firm* — Fleit Gibbons Gutman Bongini Bianco PL; Thomas S. Grzesik (57) ABSTRACT

Various embodiments provide adaptive monitoring of a wireless communication network. In one embodiment, a first set of network data generated for a wireless communication network is analyzed. The first set of network data is a set of historical network data for the wireless communication network. A baseline for at least one operating characteristic associated with the wireless communication network is determined based on the analyzing. A second set of network data generated for the wireless communication network is received. The second set of call detail records that has been received is utilized to determine if the at least one operating characteristic corresponds to the baseline. A set of monitoring operations performed by a network management system with respect to the wireless communication network is dynamically adjusted based on the at least one operating characteristic failing to correspond to the baseline.

10 Claims, 5 Drawing Sheets

(51) Int. Cl.
*H04M 15/00* (2006.01)
*H04W 16/04* (2009.01)
*H04W 28/02* (2009.01)
*H04W 28/04* (2009.01)
*H04L 12/26* (2006.01)
*H04W 88/02* (2009.01)

(52) U.S. Cl.
CPC ....... *H04W 16/04* (2013.01); *H04W 28/0289* (2013.01); *H04W 28/04* (2013.01); *H04W 88/02* (2013.01)

(58) Field of Classification Search
USPC .......... 455/423, 425, 67.11, 115.1; 709/224; 379/32.1, 32.05, 133
See application file for complete search history.

(56) References Cited

U.S. PATENT DOCUMENTS

| | | | |
|---|---|---|---|
| 7,747,412 | B1 | 6/2010 | Dasu et al. |
| 7,941,136 | B2 | 5/2011 | Reed et al. ................... 455/424 |
| 8,612,583 | B2 | 12/2013 | Hui et al. ...................... 709/224 |
| 2002/0147007 | A1 | 10/2002 | Hall et al. |
| 2008/0118042 | A1 | 5/2008 | Hogg |
| 2009/0222555 | A1 | 9/2009 | Qian et al. |
| 2009/0304165 | A1* | 12/2009 | Chung ................... H04M 3/36 379/112.06 |
| 2012/0297055 | A9 | 11/2012 | Raleigh |
| 2013/0086437 | A1 | 4/2013 | Manning et al. |

* cited by examiner

ADAPTIVE MONITORING FOR CELLULAR NETWORKS

BACKGROUND

The present invention generally relates to wireless communication networks, and more particularly relates to controlling the monitoring operation of a wireless communication network.

Telecom networks generally comprise a large number of elements and provide a diverse set of services to their customers. These networks require a very high degree of reliability and availability to provide a satisfactory user experience. However, the size and complexity of these networks makes it difficult to monitor them efficiently.

BRIEF SUMMARY

In one embodiment, a method for adaptive monitoring of a wireless communication network is disclosed. The method comprises analyzing a first set of network data generated for a wireless communication network. The first set of network data is a set of historical network data for the wireless communication network. A baseline for at least one operating characteristic associated with the wireless communication network is determined based on the analyzing. A second set of network data generated for the wireless communication network is received. The set of call detail records that has been received is utilized to determine if the at least one operating characteristic corresponds to the baseline. A set of monitoring operations performed by a network management system with respect to the wireless communication network is dynamically adjusted based on the at least one operating characteristic failing to correspond to the baseline.

In another embodiment, a computer program storage product for adaptive monitoring of a wireless communication network is disclosed. The computer program storage product comprising instructions configured to perform a method. The method comprises analyzing a first set of network data generated for a wireless communication network. The first set of network data is a set of historical network data for the wireless communication network. A baseline for at least one operating characteristic associated with the wireless communication network is determined based on the analyzing. A second set of network data generated for the wireless communication network is received. The set of call detail records that has been received is utilized to determine if the at least one operating characteristic corresponds to the baseline. A set of monitoring operations performed by a network management system with respect to the wireless communication network is dynamically adjusted based on the at least one operating characteristic failing to correspond to the baseline.

In another embodiment, an information processing system for adaptive monitoring of a wireless communication network is disclosed. The information processing system comprises a memory and a processor that is communicatively coupled to the memory. An adaptive monitor is communicatively coupled to the memory and the processor. The adaptive monitor is configured to perform a method. The method comprises analyzing a first set of network data generated for a wireless communication network. The first set of network data is a set of historical network data for the wireless communication network. A baseline for at least one operating characteristic associated with the wireless communication network is determined based on the analyzing. A second set of network data generated for the wireless communication network is received. The set of call detail records that has been received is utilized to determine if the at least one operating characteristic corresponds to the baseline. A set of monitoring operations performed by a network management system with respect to the wireless communication network is dynamically adjusted based on the at least one operating characteristic failing to correspond to the baseline.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
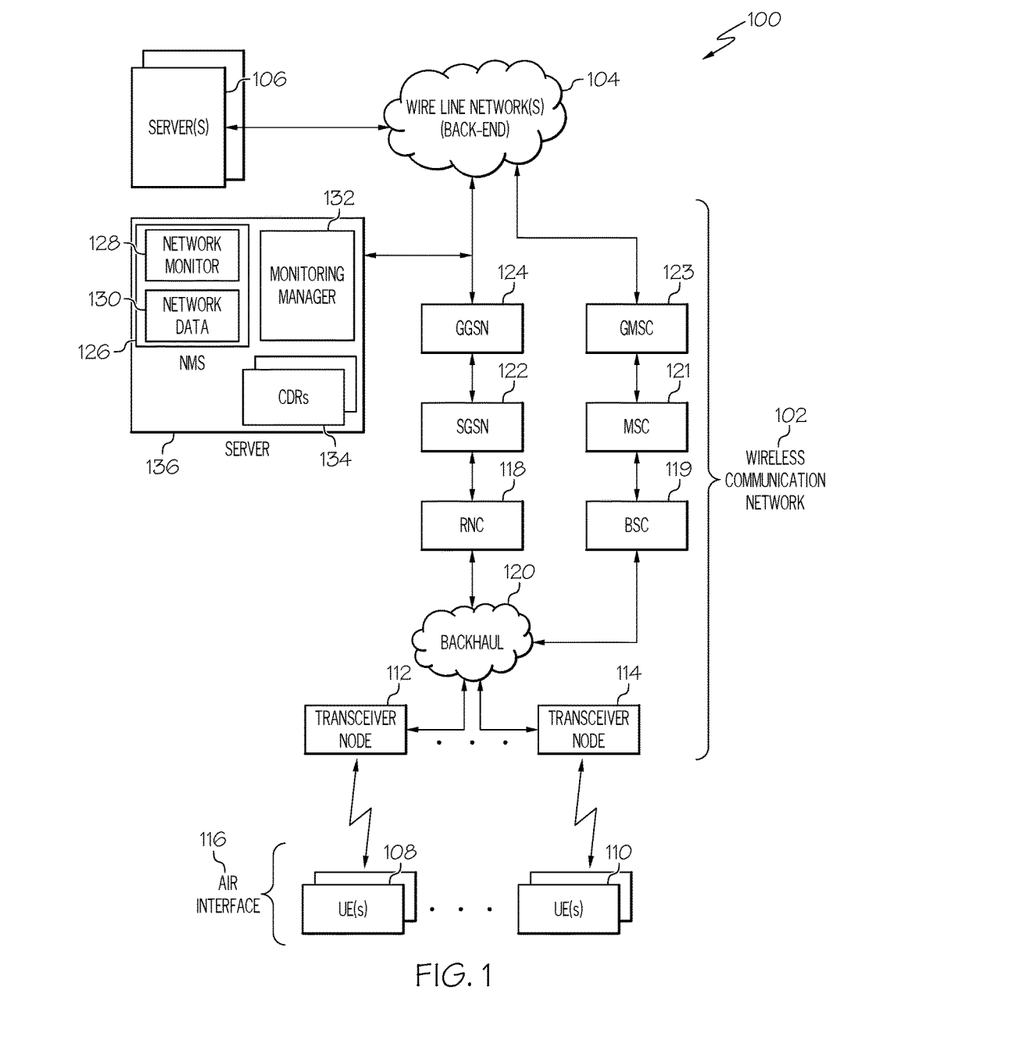
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples one or more servers 106 such as (but not limited to) content sources/providers to the wireless communication network 102. In further embodiments, the back-end is not a wire line network. For example, the back-end takes the form of a network of peers in which a mobile base station (e.g., eNode B in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, LTE Advanced (LTE-A) network, an Evolution Data Only (EV-DO) network, a GPRS network, a Universal Mobile Telecommunications System (UMTS) network, and the like.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or more transceiver nodes 112, 114 using one or more air interfaces 116 established between the UE devices 108, 110 and the transceiver node 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNode B) depending on the technology being implemented within the wireless communication network 104. Throughout this discussion a transceiver node 112, 114 is also referred to as a "base station". The base station 112, 114 is communicatively coupled to one or more antennas and a radio network controller (RNC) 118 and/or base station controller (BSC) 119, which manages and controls one or more base station 112, 114. It should be noted that in a 4G LTE network, the eNodeB communicates directly with the core of the cellular network.

The RNC 118 and/or BSC 119 can be included within or separate from a base station 112, 114. The base stations 112, 114 communicate with the RNC 118 over a backhaul link 120. In the current example, a base station 112, 114 is communicatively coupled to a Serving GPRS (SGSN) 122, which supports several RNCs 118. The SGSN 122 is communicatively coupled to Gateway GPRS Support Node (GGSN) 124, which communicates with the operator's service network (not shown). The operator's service network connects to the Internet at a peering point. It should be noted that even though UMTS components are illustrated in FIG. 1 embodiments of the present invention are applicable to other wireless communication technologies as well.

In another example, the base stations 112, 114 communicate with the BSC 119 over the backhaul link 120. In this example, a base station 112, 114 is communicatively coupled to a mobile switching center (MSC) 121, which supports several BSCs 119. The MSC 121 performs the same functions as the SGSN 122 for voice traffic, as compared to packet switched data. The MSC 121 and SGSN 122 can be co-located. The MSC 121 is communicatively coupled to a gateway mobile switching center (GMSC) 123, which routes calls outside the mobile network.

In one example, the communication protocols between the UE devices 108, 110 and the GGSN 124 are various 3rd Generation Partnership Project (3GPP) protocols over which the internet protocol (IP) traffic from the UE devices 108, 110 is tunneled. For example, a GPRS tunneling protocol (GTP) is utilized between the RNC 118 and the GGSN 124. A standard Internet Protocol (IP) is utilized between the GGSN 124 and the wire line network 104. The server(s) 106 has a TCP (Transmission Control Protocol) socket that communicates with a TCP socket at the UE devices 108, 110 when a user wishes to access data from the server 106. An IP tunnel is created from the GGSN 124 to UE devices 108, 110 for user traffic and passes through the interim components, such as the RNC 118 and the SGSN 122.

As noted above, mobile networks require a high degree of reliability and availability to provide a satisfactory user experience. Therefore, one or more embodiments of the present invention implement a network management system (NMS) 126 within or communicatively coupled to the wireless communication network 102. The NMS 126, in one embodiment, comprises a network monitor 128 that collects network data 130 associated with the wireless communication network 102. For example, the network monitor 128 periodically collects network data 120 such as (but not limited to) performance metrics associated with one or more network elements (BTS, BSC, MSC, SGSN, NodeB, RNC, GGSN, etc.) using a set of protocols such as the simple network management protocol (SNMP) or equivalent protocols. Network data 130 can also include (but is not limited to) network traffic information such as number/duration of calls, amount of data that has been transmitted/received on each network interface, interface/link failure information if any, etc. In one embodiment, special purpose hardware network probes (not shown) are communicatively coupled to one or more of these network elements. The network probes collect information corresponding to their network elements and communicate their collected data to the NMS 126. The network monitor 128 stores this received data as network data 130. In one embodiment, the network probes utilize dedicated communication channels to report the metrics they collect to the NMS 126 via SNMP or equivalent protocols.

Figure 2:
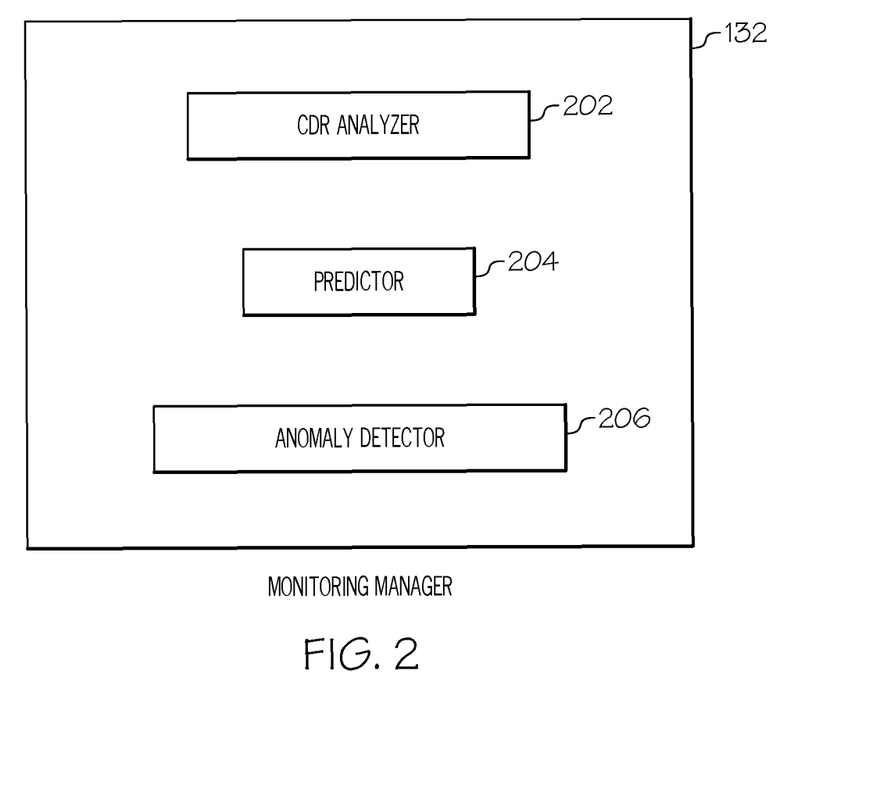
FIG. 2 is a block diagram illustrating a detailed view of an adaptive monitoring manager according to one embodiment of the present invention.

In some instances the volume of data collected by the NMS 126 can cause a significant overload on the network. Therefore, one or more embodiments implement an adaptive monitoring manager 132 within or communicatively coupled to the wireless communication network 102. The adaptive monitoring manager 132, in one embodiment, comprises a data analyzer 202, a behavior/traffic predictor 204, and an anomaly detector 206, as shown in FIG. 2. Each of these components of the adaptive monitoring manager 132 is discussed in greater detail below.

The adaptive monitoring manager 132, in one embodiment, utilizes call detail records (CDRs) 134, also referred to as "charging data records" or "call data records", to determine the status of the network operation and subsequently perform an adaptive adjustment the network monitoring operations performed by the NMS as needed. A CDR 134 is a formatted measure of a UE's service usage information (placing a phone call, accessing the Internet, etc.). For example, a CDR 134 includes information related to a telephone voice or data call such as (but not limited to) the origination and destination addresses of the call; the time the call started and ended; the duration of the call; the time of day the call was made; call termination and error codes; and other details of the call. A CDR 134 also comprises some (partial) information about which network elements handled the particular call. A CDR 134 is typically generated by one or more network functions that supervise, monitor, and/or control network access for the device such as the MSC 121 for voice calls and the SGSN 122 for data calls. One non-limiting example of a format for a CDR is provided by the 3GPP specification 32.297 (see 3gpp.org/ftp/Specs/html-info/32297.htm), which is hereby incorporated by reference.

In one embodiment, the NMS 126 and the adaptive monitoring manager 132 are co-located within one or more servers 136. However, the NMS 126 and the adaptive monitoring manager 132 are not required to be co-located. In addition, the adaptive monitoring manager 132 can be part of the NMS 126 as well. In other embodiments, the adaptive monitoring manager 132 resides at the source of the CDRs 134 (e.g., the MSC 121 and/or the SGSN 122) and/or the at the source of CDR aggregation (e.g., the server 136). The server 136, in one embodiment, is a datacenter that receives CDRs 134 from a network element such as the MSC 121 and/or the SGSN 122 for billing purposes. The server 136, in on embodiment, stores CDRs 134 for a given period of time. Stated differently, the server 136 stores and maintains historical CDR data for a given amount of time. In addition to CDR data, the server 136 can also include other information such as records of user addresses, user billing plans, etc.

Adaptive Network Monitoring Using CDRs

As will be discussed in greater detail below, the adaptive monitoring manager 132 analyzes and processes 134 CDRs to obtain proxy measures for traffic volume on a network device and/or for failures that are happening in a portion of the network 102. Once the adaptive monitoring manager 132 detects an abnormality in the metrics provided by a CDR(s) 134, the adaptive monitoring manager 132 communicates with the NMS 126 to adjust the frequency at which network performance metrics are collected from different network elements. For example, if a part of the network 102 is experiencing high failure rates, network probes that can collect more detailed information are turned on for devices in that part of the network 102. The frequency of monitoring for one or more network devices can also be increased so that more frequent detailed performance metrics are collected from that device.

In one embodiment, the adaptive monitoring manager 132 receives as input a historical set of CDRs 134 stored at the server 136 or another location and optional historical network data 130 collected by the NMS 126. The data analyzer 202 of the adaptive monitoring manager 132 utilizes this input as a training dataset for one or more machine learning operations. Based on these learning operations the adaptive monitoring manager 132 identifies normal operating characteristics/attributes (e.g., behavior) for the network 102 as a whole and/or for one or more of its network elements. The learning operations can be performed for a plurality of different operating characteristics such as (but not limited to) traffic rates experienced by the network/elements/users; congestion occurrences/rates experienced by the network/elements/users; failure occurrences/rates experienced by the network/elements/users; signal strength and other quality indication observed by the network/elements/users; and/or the like.

For each operating characteristic of interest the data analyzer 202 identifies the corresponding data/information within the historical set of CDRs 134 and/or historical network data 130 and uses this data as input for the machine learning operations. For example, if the adaptive monitoring manager 132 wants to learn a normal rate of congestion for a specific network element such as a transceiver node 112 the data analyzer 202 identifies number and duration of calls or number of bytes transmitted during a time duration from a plurality of the historical set of CDRs 134 and/or historical network data 130 and uses this data as input for the learning operations.

Based on the learning/prediction operations the adaptive monitoring manager 132 learns a baseline/threshold for one or more operating characteristics corresponding to the entire network 102 and/or one more specific network elements. Stated differently, the adaptive monitoring manager 132 learns the normal behavior of the network 102 and/or one or more of its elements. It should be noted that normal operating characteristics can be learned at different granularities such as specific times of the day, week, year, etc. Also, it should be noted that the normal operating characteristics may capture regular changes in network traffic and conditions that are found daily, weekly, monthly, etc. For example, these captured characteristics can indicate that the number of calls observed during normal business hours is greater than the number of calls observed during the late evening or early morning hours. The learned normal operating characteristics are then used as the expected state of the network or its elements when analyzing new network data (such as per call measurement data, or PCMD) 130 and/or CDRs 134.

The following is one example of learning the normal operating characteristics of the network 102. In this example, the normal operating characteristic of interest is the normal traffic pattern of voice calls that are observed in a region (e.g., calls placed and received in the area code 914) that has been operated normally. Past network data and/or CDRs collected for that region are analyzed and the number/duration of calls and failure occurrences that have been observed during a certain time period are counted, which yields the normal traffic pattern for the region of interest. This analysis process can be performed at various levels of granularity. For example, the operation characteristic for the past month can be analyzed in terms of number of calls and failures at a 15 minute granularity. This establishes the normal operating characteristics of the network in terms of number/duration of calls for that month.

As new network data 130 and/or CDRs 134 are generated they are sent to the server 136 and processed by the adaptive monitoring manager 132. The anomaly detector 206 of the adaptive monitoring manager 132 compares the newly received data 130, 134 to the expected state/value(s) for one or more operating characteristics of interest to determine if abnormal behavior is occurring. For example, if the adaptive monitoring manager 126 is interested in failure occurrences (e.g., dropped calls) within the network/elements the anomaly detector 206 analyzes the received data to determine a current state of the network/elements with respect to failure occurrences. The failure occurrence, for example, can be identified from the error code contained in the CDR or can be learned from PCMD. The current state in this example can be a number of failure occurrences that have occurred within the network/elements for a given interval of time.

The anomaly detector 206 then compares current state determined for the operating characteristic of interest to the expected state/value(s) for this operating characteristic. In particular, the expected state is used as a threshold to determine if abnormal behavior is occurring in the network/elements. In one embodiment, if the current state satisfies this threshold (i.e. corresponds to the expected state) the anomaly detector 206 determines that the operating characteristic of interest is within normal limits. If the current state fails to satisfy the threshold (i.e. does not correspond to the expected state) the anomaly detector 206 determines that abnormal behavior is occurring within the network/elements. It should be noted that depending on the expected state, the current value(s) can satisfy or fail to satisfy the state/threshold by either being one of equal to or less than the threshold, or by being one of equal to or greater than the threshold. It should also be noted that anomaly detection (abnormal behavior detection) can be performed for a plurality of different operating characteristics of interest either simultaneously or in a pipelined manner.

In one embodiment, if the network/elements are determined to be operating within normal conditions with respect to the operating characteristic(s) of interest the anomaly detector 206 adds the data from the CDR 134 and/or network data 130 corresponding to the operating characteristic(s) of interest to the historical set of CDRs 134 and network data 130, respectively. The data analyzer 202 can then perform one or more machine learning operations on this updated set of historical data to update the expected state of the operating characteristic(s) of interest. It should be noted that data from CDRs 134 indicating abnormal behavior in the network 102 and/or its elements can also be added to the historical set of CDRs 134 as well.

If the network 102 and/or given network elements are determined to be operating abnormally, the anomaly detector 206 communicates with the NMS 126 to initiate and/or modify its monitoring processes. Stated differently, the monitoring operations of the NMS 126 are adapted/adjusted based on the detected abnormal (or normal) behaviors of the network 102 and/or one or more of its elements. This adaptation process can include starting/stopping the monitoring of the network 102 as a whole or one or more of its elements. As discussed above, the amount of data collected by the NMS 126 and the number of resources required by the NMS 126 can be very large. The NMS 126 can be configured to start or stop all monitoring operations or monitoring operations for one or more network elements. For example, if a given set of network elements is exhibiting abnormal behavior the network probes only for this set of network elements can be started. Once the adaptive monitoring manager 132 determines that the given set of network elements is exhibiting normal behavior the monitoring of these elements can be stopped or the frequency of monitoring can be reduced.

The adaptation process can further include increasing/decreasing the frequency of monitoring by the NMS 126. For example, to save resources the NMS 126 can be initially configured to perform monitoring of the network 102 as a whole or one or more of its elements at a low frequency. When the network 102 or a set of its elements is exhibiting abnormal behavior the frequency of monitoring (e.g., frequency of data collection) for these elements can be increased. Once the adaptive monitoring manager 132 determines that the given set of network elements is exhibiting normal behavior the monitoring of these elements can be decreased.

In other embodiments, the adaptation process can also include categorizing information collected by the NMS 126 into different levels of detail on the network side. Adaptation can then be enabled through incremental drill down to first provide a coarse level information and then finer-level information if a current coarse-level information is not sufficient. For example, coarse level information can be the originating and terminating base station for a session, whereas finer-level information can be the CDRs per handoff to capture all the base station associations along a user's trajectory. This adaptation process can be performed manually or automatically (e.g., based on configuration, script, policy rules).

In another embodiment, the adaptation process includes classifying information logged on the network side into different classes based on different failure codes. Then a code-specific class can be enabled for monitoring dynamically. That is, only certain information may be relevant to certain kinds of cause codes. The classification can be automatically learned over a period of time, by examining the "utility" (or importance) of different data items received for each failure type. The NMS 126 can then be configured to only collect the information that is relevant to a class of cause codes.

In some situations, there can be a time lag between generation of logs (e.g., CDRs 134) at the source network element (MSC/SGSN/GGSN) and its availability at the point of storage and analysis (e.g., server 136). In such a case, the prediction module 204 of the adaptive monitoring manager 126 performs one or more prediction algorithms for estimating the current state and adapting the NMS monitoring operations based thereon. These prediction operations keep the monitoring adaptation in real-time when a time lag occurs. Any prediction algorithm can be used to predict the current state of the network and/or one or more of its elements. For example, forecasting algorithms that are based on regression such as linear regression, auto regression, or exponential smoothing such as Holt-Winters can be used to predict what is the normal behavior of the network/elements in the near future.

It should also be noted that the adaptive monitoring manager 132 is not limited to residing within the server 136 and/or the NMS 126. For example, the adaptive monitoring manager 132 can reside at the source of the CDRs 134, which are network elements such as the MSCs 119, the SGSNs 122, GGSN, etc. The network elements can analyze the cause codes of failure and increase the reporting frequency of the NMS network data 130 if the failure rate increases above a certain threshold. In another embodiment, the adaptive monitoring manager 132 can also reside at a point of aggregation of the CDRs 134 such as a telephone exchange. In this embodiment, logs from multiple network elements are analyzed to identify an area that is experiencing issues such as all the NodeBs attached to a specific RNC. The adaptive monitoring manager 132 can then increase the monitoring performed by the NSM 126 at each of the corresponding elements.

It should also be noted that the adaptive monitoring manager 132 is not limited to analyzing network data 130 and CDRs 134. For example, the adaptive monitoring manager 132 can be integrated with other sources of information such as (but not limited to) a customer care system to adapt its operation based on external information. In another embodiment, the adaptive monitoring manager 132 is integrated with side-channel information. A side-channel can be, but is not limited to, a news source about events that result in major changes in network used. For example, if it is known that a certain event such as a holiday, festival, concert, severe weather occurrence, etc. is occurring within a specific region the network monitoring operations of the NMS 126 for that region can be augmented appropriately.

Operational Flow Diagrams

Figure 3:
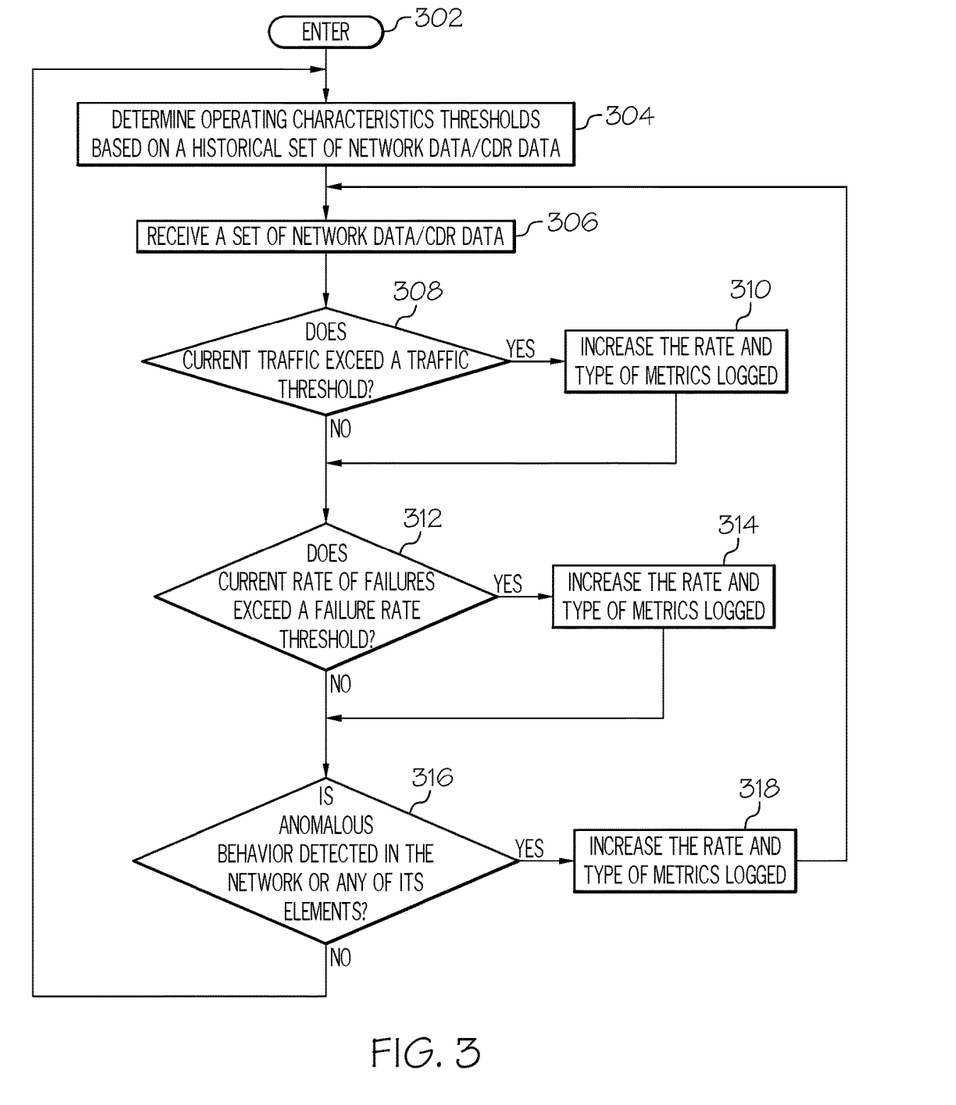
FIG. 3 is an operational flow diagram illustrating one example of adaptive monitoring in a wireless communication network according to one embodiment of the present invention.

FIG. 3 is an operational flow diagram illustrating one example of adaptive monitoring for a wireless communications network. The operational flow diagram of FIG. 3 begins at step 302 and flows directly to step 304. The adaptive monitor 132, at step 304, determines operating characteristic thresholds for one or more operating characteristics of the network 102 and/or any of its elements. As discussed above, these thresholds or expected states are based on a set of network data 130 and/or a set of historical CDR data 134. In one embodiment, the set of network data 130 comprises the CDR data 134. The adaptive monitor 132, at step 306, receives a set of CDRs and/or network data.

The adaptive monitor 132 compares the information within the received set of CDRs and/or network data to one or more of the operating characteristic thresholds. For example, the adaptive monitor 132, at step 308, determines if a current traffic rate/pattern indicated by the received set of CDRs and/or network data exceeds a traffic threshold. If the result of this determination is positive, the adaptive monitor 132, at step 310, increases the rate and type of metrics logged by the NMS 126. If the result of this determination is negative, the adaptive monitor 132, at step 312, determines if a current rate of failures indicated by the received set of CDRs and/or network data exceeds a failure threshold. If the result of this determination is positive, the adaptive monitor 132, at step 314, increases the rate and type of metrics logged by the NMS 126. If the result of this determination is negative, the adaptive monitor 132, at step 316, determines if any anomalous behavior has been detected based on a comparison of the information within the received set of CDRs and/or network data and the historical set of CDRs 134 and/or historical set of network data 130. If the result of this determination is positive, the adaptive monitor 132, at step 318, increases the rate and type of metrics logged by the NMS 126. If the result of this determination is negative, the control flow returns to step 304 where the thresholds are updated based on the received set of CDRs and/or network data. It should be noted that if a given threshold is not exceeded or anomalous behavior is not detected the adaptive monitor 132 can also decrease the rate and type of metrics logged by the NMS 126 if logging is currently being performed. It should be noted that the normal operation range may be represented as a range or a set of values, not just as a threshold. In this embodiment, the same process applies with the change of testing if a new value is within the range or not, or if a new value is in the set or not.

Figure 4:
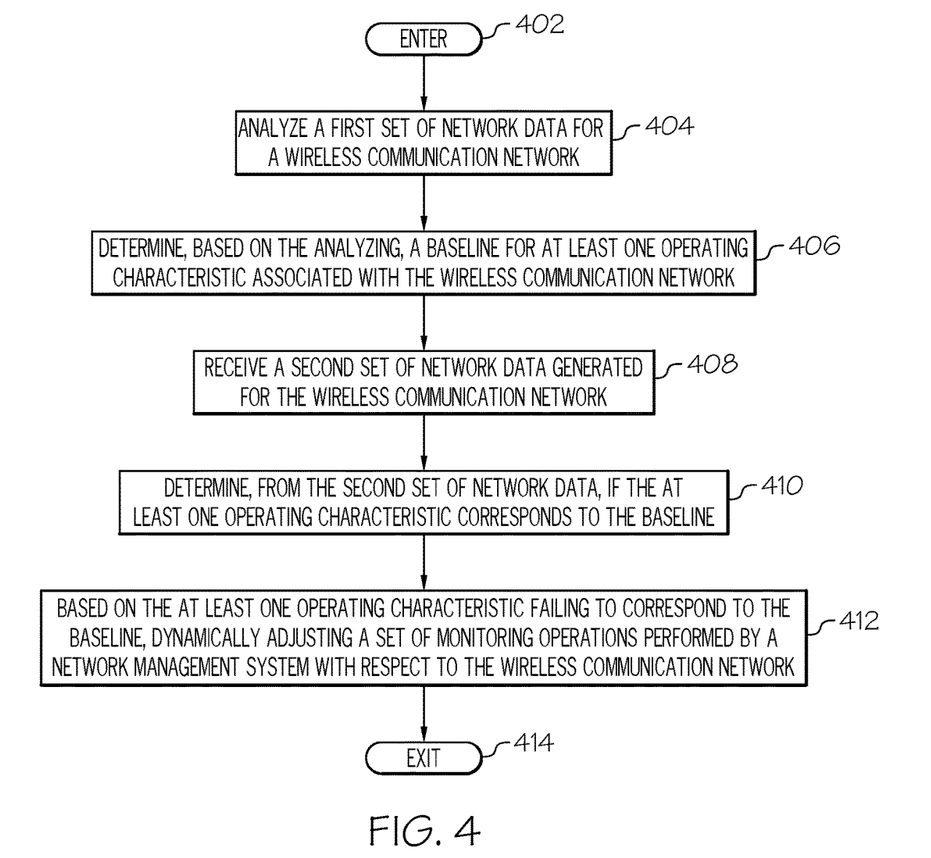
FIG. 4 is an operational flow diagram illustrating another example of adaptive monitoring in a wireless communication network according to one embodiment of the present invention and FIG. 5 is a block diagram illustrating one example of an information processing system according to one embodiment of the present invention.

FIG. 4 is an operational flow diagram illustrating another example of adaptive monitoring for a wireless communications network. The operational flow diagram of FIG. 4 begins at step 402 and flows directly to step 404. The adaptive monitor 132, at step 404, analyzes a first set network data such as (but not limited to) call detail records 134 generated for a wireless communication network 102. In this embodiment, the first set of network data is a set of historical network data (e.g., historical call detail records) for the wireless communication network 102. The adaptive monitor 132, at step 406, determines, based on the analyzing, a baseline for at least one operating characteristic associated with the wireless communication network 102.

The adaptive monitor 132, at step 408, receives a second set of network data such as (but not limited to) call detail records generated for the wireless communication network 102. The adaptive monitor 132, at step 410, determines, from the second set of network data that has been received, if the at least one operating characteristic corresponds to the baseline. The adaptive monitor 132, at step 412, dynamically adjusts, based on the at least one operating characteristic failing to correspond to the baseline, a set of monitoring operations performed by a network management system 126 with respect to the wireless communication network 102. The control flow exits at step 414.

Information Processing System

Figure 5:
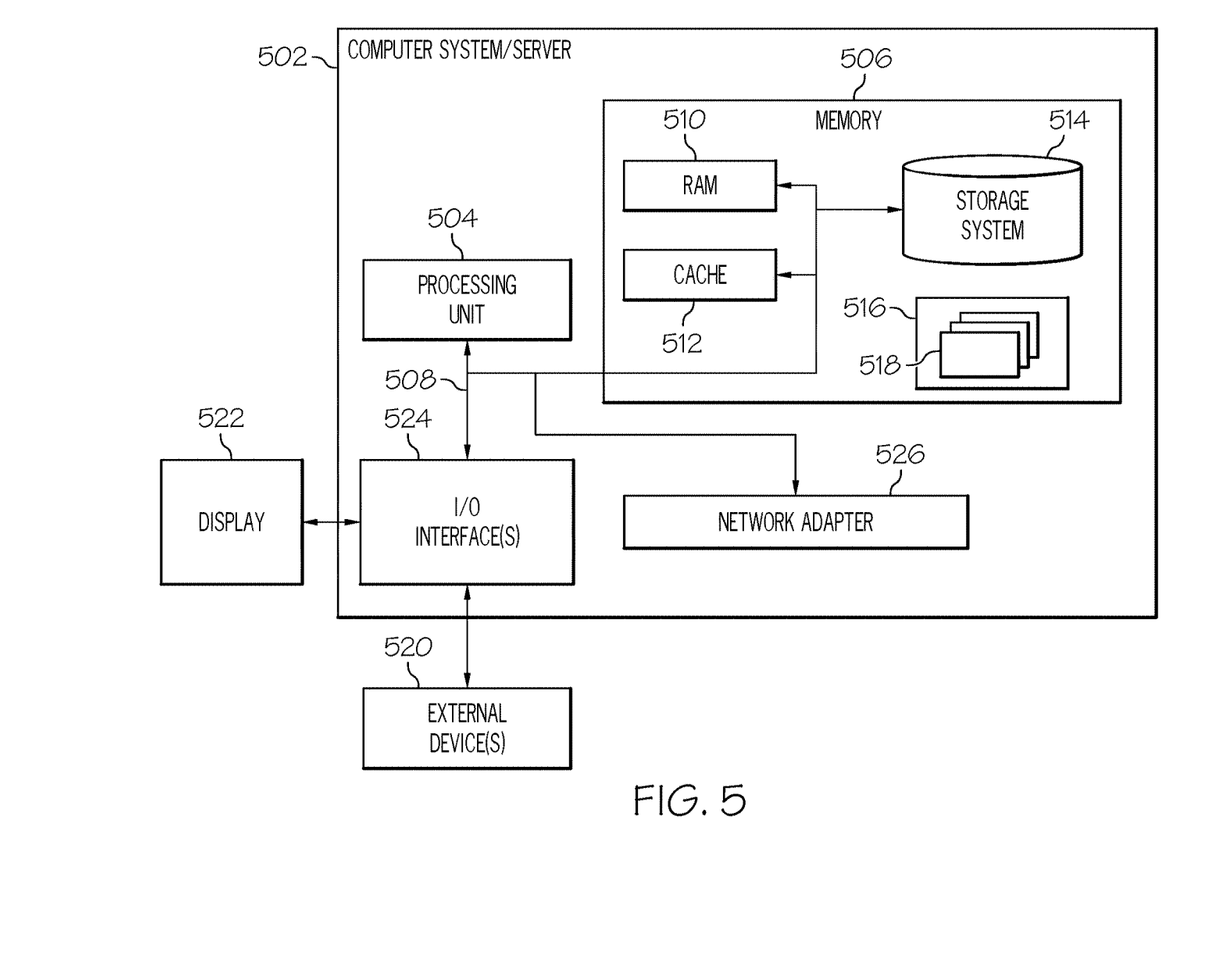

Referring now to FIG. 5, this figure is a block diagram illustrating an information processing system that can be utilized in various embodiments of the present invention. The information processing system 502 is based upon a suitably configured processing system configured to implement one or more embodiments of the present invention. Any suitably configured processing system can be used as the information processing system 502 in embodiments of the present invention. The components of the information processing system 502 can include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 5, the main memory 506 includes at least the adaptive monitor 132 and its components shown in FIG. 1. Each of these components can reside within the processor 504, or be a separate hardware component. The system memory 506 can also include computer system readable media in the form of volatile memory, such as random access memory (RAM) 510 and/or cache memory 512. The information processing system 502 can further include other removable/non-removable, volatile/non-volatile computer system storage media. By way of example only, a storage system 514 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 508 by one or more data media interfaces. The memory 506 can include at least one program product having a set of program modules that are configured to carry out the functions of an embodiment of the present invention.

Program/utility 516, having a set of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of embodiments of the present invention.

The information processing system 502 can also communicate with one or more external devices 520 such as a keyboard, a pointing device, a display 522, etc.; one or more devices that enable a user to interact with the information processing system 502; and/or any devices (e.g., network card, modem, etc.) that enable computer system/server 502 to communicate with one or more other computing devices. Such communication can occur via I/O interfaces 524. Still yet, the information processing system 502 can communicate with one or more networks such as a local area network (LAN), a general wide area network (WAN), and/or a public network (e.g., the Internet) via network adapter 526. As depicted, the network adapter 526 communicates with the other components of information processing system 502 via the bus 508. Other hardware and/or software components can also be used in conjunction with the information processing system 502. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information processing system for adaptive monitoring of a wireless communication network, the information processing system comprising:
    a memory;
    a processor communicatively coupled to the memory; and
    an adaptive monitor communicatively coupled to the memory and the processor, wherein the adaptive monitor is configured to perform a method comprising:
        analyzing a first plurality of call detail records, wherein each call detail record in the first plurality of call detail records is generated for a user equipment device in a wireless communication network and comprises recorded data associated with at least one of a given voice session and a given data session participated in by the user equipment, and wherein the first set of network data is a historical plurality of call detail records;
        determining, based on the analyzing and from the plurality of call detail records, a baseline for at least one operating characteristic associated with the wireless communication network;
        receiving a second plurality of call detail records generated for a user equipment device in the wireless communication network, wherein each call detail record in the second plurality of call detail records comprises recorded data associated with at least one of a given voice session and a given data session participated in by the user equipment, the second plurality of call detail records having been generated subsequent to the first plurality of call detail records;
        determining, from the second plurality of call detail records, if the at least one operating characteristic corresponds to the baseline; and
        based on the at least one operating characteristic failing to correspond to the baseline,
            dynamically adjusting a set of monitoring operations performed by a network management system with respect to a subset of network elements associated with the operating characteristic failing to correspond to the baseline.

2. The information processing system of claim 1, further comprising:
    determining baseline based on a set of metrics measured for the wireless communication network.

3. The information processing system of claim 1, wherein the at least one operating characteristic comprises at least one of:
    a traffic rate associated with the wireless communication network;
    a congestion rate associated with the wireless communication network; and
    a failure rate associated with the wireless communication network.

4. The information processing system of claim 1, wherein determining if the at least one operating characteristic corresponds to the baseline comprises:
    analyzing the second plurality of call detail records;
    identifying, based on the analyzing, the at least one operating characteristic from the second plurality of call detail records.

5. The information processing system of claim 1, wherein dynamically adjusting the set of monitoring operations comprises:
    increasing at least one of a number and a frequency of a set of monitoring operations performed by the network management system, wherein the set of monitoring operations collect data associated with the at least one operating characteristic.

6. The information processing system of claim 1, wherein the method further comprises:
    based on the at least one operating characteristic corresponding to the baseline, updating the baseline based on information from the second plurality of call detail records.

7. The information processing system of claim 1, wherein the method further comprises:
    based on the at least one operating characteristic corresponding to the baseline, dynamically adjusting a set of monitoring operations performed by the network management system with respect to the wireless communication network, wherein the dynamically adjusting comprises
        decreasing at least one of a number and a frequency of a set of monitoring operations performed by the network management system, wherein the set of monitoring operations collect data associated with the at least one operating characteristic.

8. The information processing system of claim 1, wherein at least one of the set of monitoring operations controls a network probe communicatively coupled to at least one of the subset of network elements.

9. The information processing system of claim 1, wherein the session is one of a voice session and a data session.

10. The information processing system of claim 1, further comprising:
    based on the at least one operating characteristic failing to correspond to the baseline
        identifying the subset of network elements from a plurality of network elements in the wireless communication network.

* * * * *